(12) United States Patent
Valencia et al.

(10) Patent No.: US 10,274,252 B2
(45) Date of Patent: Apr. 30, 2019

(54) PURGE TO INTERMEDIATE PRESSURE IN CRYOGENIC DISTILLATION

(71) Applicants: Jaime A. Valencia, Houston, TX (US); Scott D. Kelman, Houston, TX (US); E. Lawrence Kimble, Sugar Land, TX (US)

(72) Inventors: Jaime A. Valencia, Houston, TX (US); Scott D. Kelman, Houston, TX (US); E. Lawrence Kimble, Sugar Land, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 358 days.

(21) Appl. No.: 15/154,413

(22) Filed: May 13, 2016

(65) Prior Publication Data

US 2016/0370110 A1 Dec. 22, 2016

Related U.S. Application Data

(60) Provisional application No. 62/183,033, filed on Jun. 22, 2015.

(51) Int. Cl.
| | | |
|---|---|---|
| *F25J 3/00* | (2006.01) | |
| *F25J 3/02* | (2006.01) | |
| *C10L 3/10* | (2006.01) | |

(52) U.S. Cl.
CPC ............ *F25J 3/0233* (2013.01); *C10L 3/104* (2013.01); *F25J 3/0209* (2013.01); *F25J 3/0266* (2013.01); *F25J 3/0295* (2013.01); *F25J 2200/02* (2013.01); *F25J 2200/74* (2013.01); *F25J 2205/20* (2013.01); *F25J 2220/66* (2013.01); *F25J 2240/40* (2013.01);
(Continued)

(58) Field of Classification Search
CPC ........ F25J 3/0209; F25J 3/0233; F25J 3/0266; F25J 2280/40; F25J 2200/02; F25J 2205/20; F25J 2200/74; C10L 3/104; Y10C 10/12
See application file for complete search history.

(56) References Cited

U.S. PATENT DOCUMENTS

| 3,306,057 A | * | 2/1967 | Harmens ................ F25J 3/0209 |
|---|---|---|---|
| | | | 62/54.1 |
| 4,533,372 A | | 8/1985 | Valencia et al. .................. 62/12 |

(Continued)

FOREIGN PATENT DOCUMENTS

WO WO 2013/171421 A2 11/2013

OTHER PUBLICATIONS

U.S. Appl. No. 14/848,716, filed Sep. 9, 2015, N.F. Urbanski.
(Continued)

*Primary Examiner* — Keith M Raymond
(74) *Attorney, Agent, or Firm* — ExxonMobil Upstream Research Company—Law Department

(57) ABSTRACT

A system and method for an intermediate pressure vessel to receive a purge in a cryogenic distillation column system. The vessel operates at an intermediate pressure to reduce solidification of the purge. The cryogenic distillation column receives a natural gas having methane and acid gas. The column discharges an overhead stream rich in the methane, and a bottoms stream rich in the acid gas. An overhead system receives the overhead stream, and discharges a vapor methane product, and a cooled liquid for reflux to the cryogenic distillation column.

8 Claims, 7 Drawing Sheets

(52) U.S. Cl.
CPC ........ *F25J 2245/02* (2013.01); *F25J 2280/10* (2013.01); *F25J 2280/40* (2013.01); *F25J 2290/62* (2013.01); *Y02C 10/12* (2013.01)

(56) References Cited

U.S. PATENT DOCUMENTS

| | | | | |
|---|---|---|---|---|
| 4,923,493 | A | 5/1990 | Valencia et al. .................. | 62/13 |
| 5,062,270 | A * | 11/1991 | Haut ...................... | F25J 3/0209 62/629 |
| 5,120,338 | A | 6/1992 | Potts, Jr. et al. .................. | 62/12 |
| 5,265,428 | A | 11/1993 | Valencia et al. .................. | 62/36 |
| 5,956,971 | A | 9/1999 | Cole et al. ...................... | 62/623 |
| 6,053,007 | A | 4/2000 | Victory et al. .................... | 62/619 |
| 2003/0136146 | A1* | 7/2003 | Fischer-Calderon ..... | C01B 3/34 62/613 |
| 2008/0034789 | A1 | 2/2008 | Fieler et al. .................... | 62/623 |
| 2009/0266107 | A1 | 10/2009 | Singh et al. .................... | 62/617 |
| 2010/0018248 | A1 | 1/2010 | Fieler et al. .................... | 62/617 |
| 2011/0308482 | A1* | 12/2011 | Hottovy .................... | F02C 3/28 123/3 |
| 2012/0031144 | A1* | 2/2012 | Northrop .................. | C10L 3/10 62/617 |
| 2012/0079852 | A1 | 4/2012 | Northrop et al. ............... | 62/620 |
| 2012/0125043 | A1 | 5/2012 | Cullinane et al. .............. | 62/620 |
| 2012/0204599 | A1 | 8/2012 | Northrop et al. ............... | 62/617 |
| 2012/0279728 | A1 | 11/2012 | Northrop et al. ............. | 166/401 |
| 2013/0074541 | A1 | 3/2013 | Kaminsky et al. ......... | F25J 1/00 |
| 2013/0098105 | A1 | 4/2013 | Northrop ............... | F25J 3/0266 |
| 2014/0137599 | A1 | 5/2014 | Oelfke et al. ........... | F25J 3/069 |
| 2014/0338395 | A1 | 11/2014 | Oelfke et al. ...... | B01D 53/1418 |
| 2015/0013377 | A1 | 1/2015 | Oelfke .................. | F25J 1/0027 |
| 2015/0158796 | A1 | 6/2015 | Valencia ................... | C07C 7/05 |
| 2015/0159939 | A1 | 6/2015 | Valencia ............... | F25J 1/0022 |
| 2015/0159940 | A1 | 6/2015 | Valencia et al. ........ | F25J 1/0022 |
| 2015/0159941 | A1 | 6/2015 | Valencia et al. ....... | F25J 3/0209 |
| 2015/0159942 | A1 | 6/2015 | Valencia et al. ....... | F25J 3/0209 |
| 2015/0159943 | A1 | 6/2015 | Valencia et al. ....... | F25J 3/0233 |
| 2015/0159944 | A1 | 6/2015 | Valencia et al. ........... | F25J 3/08 |
| 2015/0159945 | A1 | 6/2015 | Valencia et al. ........... | F25J 3/08 |
| 2015/0159946 | A1 | 6/2015 | Valencia ................. | F25J 3/08 |
| 2015/0159947 | A1 | 6/2015 | Valencia et al. ........... | F25J 3/08 |
| 2015/0291421 | A1 | 10/2015 | Northrop ............... | C01B 17/06 |
| 2015/0300735 | A1 | 10/2015 | Valencia .................. | F25J 3/06 |
| 2015/0362251 | A1 | 12/2015 | Oelfke ...................... | F25J 3/06 |
| 2016/0010917 | A1 | 1/2016 | Northrop et al. .......... | F25J 3/02 |
| 2016/0116210 | A1 | 4/2016 | Denton et al. ............ | F25J 3/08 |

OTHER PUBLICATIONS

U.S. Appl. No. 14/944,941, filed Nov. 18, 2015, Urbanski et al.
U.S. Appl. No. 14/994,526, filed Jan. 13, 2016, Nagavarapu et al.

* cited by examiner

100

116A

214

PURGE TO INTERMEDIATE PRESSURE IN CRYOGENIC DISTILLATION

CROSS REFERENCE TO RELATED APPLICATIONS

This application claims the priority and benefit of U.S. Provisional Application No. 62/183,033 filed Jun. 22, 2015, entitled PURGE TO INTERMEDIATE PRESSURE IN CRYOGENIC DISTILLATION, the entirety of which is incorporated by reference herein.

FIELD OF THE DISCLOSURE

The present techniques relate generally to purification of natural gas via cryogenic distillation, and more particularly, to one or more purges to an intermediate pressure vessel from the cryogenic distillation system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Most raw natural gas extracted from the Earth is primarily methane ($CH_4$) with smaller amount of other hydrocarbons and varying degrees of different "contaminants." The methane component, as a low molecular weight hydrocarbon, is typically the desirable component within the raw natural gas. Applications for methane recovered from raw natural gas may include fuel for vehicles, power generation, and so on. Moreover, in many cities, such $CH_4$ is piped into homes for domestic heating and cooking purposes. In this context, methane is usually known as natural gas.

The demand to provide effective techniques to separate and remove contaminants from raw natural gas to give purified natural gas or methane has significantly increased. The contaminants and impurities in raw natural gases may include acid gases such as carbon dioxide ($CO_2$), hydrogen sulfide ($H_2S$), mercaptans, and the like. The contaminants may also include nitrogen ($N_2$), helium (He), water vapor, liquid water, mercury, and so forth. Such contaminants and impurities may lead to equipment malfunction, production failure, product contamination, among other detrimental production issues. For example, $CO_2$ contaminant when combined with water may create a corrosive form of carbonic acid. Additionally, for example, at $CO_2$ concentrations of more than 2%, the presence of the $CO_2$ may reduce the BTU value of the natural gas and lower the economic viability of the natural gas.

To remove $CO_2$ and other acid gases, the natural gas may be subjected to cryogenic distillation. Distillation is a widely used way of effecting relative-volatility based separations. A cryogenic distillation system may provide for separating mixtures based on their relative volatility at cryogenic temperatures. In some cryogenic distillation systems, one or more components may solidify. Indeed, in the cryogenic distillation, the operating temperature, pressure, and component concentrations may lead to solidification of the $CO_2$. Therefore, certain purification systems may control such solidification. For instance, the system may provide for a freezing section in a cryogenic distillation column in which $CO_2$ solidification is permitted and managed. If so, solidification of $CO_2$ outside of the freezing section is typically undesirable. Such solidification of $CO_2$ outside of the freezing section may be more prone to occur during startup of the distillation system when disturbances are more likely during initial conditions and because of the transient and non-linear behavior of startup. The undesired solidification, e.g., $CO_2$ solidification outside of the freezing section, may occur in the distillation column or elsewhere in the distillation column system, such as in the overhead system of the distillation column.

In general, during normal operations of the cryogenic distillation column, $CO_2$ contaminant, among other contaminants, may be separated and removed from the raw natural gas to produce a purified methane gas product. To startup the cryogenic distillation column, prior to steady state or normal operating conditions, various startup techniques may be implemented. For instance, the startup may be "assisted" in which solidification inhibitors, and/or a clean methane flow for liquid reflux, are utilized until normal operation is reached, while avoiding solidification in undesirable locations. Unfortunately, the solidification inhibitors and the clean methane gas either impose additional costs or may not be readily available.

In the worldwide natural-gas production industry where hundreds of trillions of standard cubic meters of raw natural gas are extracted from the Earth and processed, there remains an ongoing need to continuously improve such extraction and processing techniques. In particular, there remains a need for improved cryogenic distillation systems for separating contaminants from raw gas streams.

SUMMARY

An aspect relates to cryogenic distillation column system including a cryogenic distillation column having a freezing section, wherein the cryogenic distillation column is configured to receive a natural gas having methane and acid gas, and to discharge an overhead stream rich in the methane, and a bottoms stream rich in the acid gas. The system has an overhead system configured to receive the overhead stream, and to discharge a vapor methane product, and a cooled liquid for reflux to the cryogenic distillation column. The system includes an intermediate pressure vessel configured to receive a purge and operate at an intermediate pressure to reduce solidification of the purge.

Another aspect relates to a method of operating a cryogenic distillation column system, the method including feeding natural gas having methane and acid gas to a cryogenic distillation column having a freezing section, wherein the acid gas includes carbon dioxide. The method includes discharging an overhead stream rich in the methane from the cryogenic distillation column to an overhead system. The method includes discharging, via a purge valve, a purge to an intermediate pressure vessel to reduce solidification of the carbon dioxide during startup of the cryogenic distillation column system.

Yet another aspect relates to a method of operating a cryogenic distillation column system, the method including feeding natural gas having methane and acid gas to a cryogenic distillation column having a freezing section, the acid gas including carbon dioxide. The method includes discharging an overhead stream rich in the methane from the cryogenic distillation column to an overhead system. The method includes purging to an intermediate pressure vessel to reduce solidification of carbon dioxide in the cryogenic distillation column system during startup of the cryogenic distillation column system. Further, the method includes maintaining an operating pressure of the intermediate pressure vessel to reduce solidification of carbon dioxide in the purging. The method includes discharging purge material from the intermediate pressure vessel to a flare system or a recovery system.

DESCRIPTION OF THE DRAWINGS

The advantages of the present techniques are better understood by referring to the following detailed description and the attached drawings, in which.

DETAILED DESCRIPTION

Figure 1:
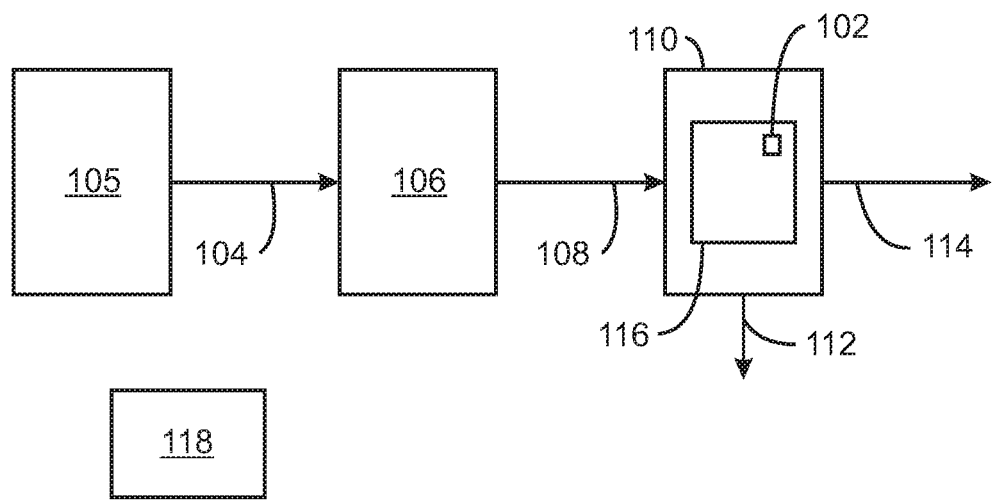
FIG. 1 is a block flow diagram of an exemplary system for the production of natural gas or methane.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

In the production of natural gas to give a methane gas product, embodiments of the present techniques provide for purges from a cryogenic distillation column system to facilitate startup of the cryogenic distillation column system. The purges may discharge from the relatively high-pressure distillation to intermediate pressure prior to introduction of the purge material to a lower pressure recovery or disposal system, such as a flare system. Therefore, as discussed below, purge streams having contaminant concentrations, such as $CO_2$ concentrations, may be beneficially discharged without experiencing solidification, or if some solidification does occur, the solids may be more suitably managed and eventually melted, vaporized, or sublimed. Moreover, in contrast to "assisted" start-up methods in which solidification inhibitors and/or a clean methane supply is utilized, embodiments herein may advantageously provide for an "unassisted" startup. This startup may be unassisted in the sense that raw natural gas is the source of gas used to generate the liquid reflux for the cryogenic distillation column, and to transition the cryogenic distillation to normal operation. Beneficially, the use of solidification inhibitors and/or a supply of clean natural gas may be avoided.

The cryogenic distillation column may be configured with a freezing section in which $CO_2$ solidification is permitted and managed. Solidification of $CO_2$ outside of the freezing section is normally undesirable. Undesired solidification, i.e., $CO_2$ solidification outside of the freezing section, may occur in the distillation column or elsewhere in the distillation column system, such as in the overhead system of the distillation column. This solidification of $CO_2$ outside of the freezing section may be more prone to occur during an "unassisted" startup of the cryogenic distillation system where high $CO_2$ content gas circulates through the rectifier and overhead system before the $CO_2$ is reduced to a low enough content such that liquid reflux can be generated. Therefore, the distillation column system is desirably configured with purge points that allow discharge of problematic fluids or streams that might experience solidification, or that might contribute to solidification in the distillation column, piping, valves, or associated equipment. The purge discharge may occur temporarily, intermittently, or continuously.

A slipstream or all of an overhead stream unusually high in $CO_2$ concentration, for example, may be purged to a flare or recovery system, for instance. Further, warm fluids, such as from vessels or pipes that are being cooled for service, and which might disrupt the startup, may also be purged to the flare. Flare systems, including flare headers, typically operate at low pressure, such as at near atmospheric or at only a few pounds per square inch (psig). Thus, a purge of a stream high in $CO_2$ concentration from the higher pressure cryogenic distillation system to a low pressure flare or recovery system may result in solidification of $CO_2$ in the purge or vent. In response, embodiments of the present techniques provide an intermediate-pressure drum or vessel disposed operationally between the distillation system and the flare system. The intermediate pressure vessel is configured to receive the purges or vents, and to discharge the purged material to a flare header and/or directly to a flare knockout drum (also known as a knockout pot). The intermediate pressure vessel is maintained at an intermediate pressure to provide for a more gradual step-down in pressure of the purges/vents from the distillation column to the flare so to avoid or reduce unwanted solidification.

For ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion.

As used herein, "substantially", "predominately", and other words of degree are relative modifiers intended to indicate permissible variation from the characteristic so modified. It is not intended to be limited to the absolute value or characteristic which it modifies, but rather possessing more of the physical or functional characteristic than its opposite, and preferably, approaching or approximating such a physical or functional characteristic.

The term "rich" may refer to a compound or class of compounds that is most represented in a stream, by weight or mole percent. The term "rich" can refer to a compound or class of compounds that is a majority of a stream, by weight or mole percent. Lastly, the term "rich", when used in reference to a product stream, indicates that the product stream comprises a relatively higher amount of a certain component than the feed stream from which the product stream originated.

"Exemplary" is used exclusively herein to mean "serving as an example, instance, or illustration." Any embodiment described herein as "exemplary" is not to be construed as preferred or advantageous over other embodiments.

The term "acid gas" refers to any gas that dissolves in water to produce an acidic solution. Non-limiting examples of acid gases include hydrogen sulfide ($H_2S$), carbon dioxide ($CO_2$), sulfur dioxide ($SO_2$), or mixtures thereof. The term "trace sulfur compounds" includes carbon disulfide ($CS_2$), carbonyl sulfide (COS), mercaptans, or mixtures thereof. The term "acid gas injection" (AGI) refers to the disposal of an acid gas stream by compressing it and introducing the pressurized stream into a subterranean reservoir.

The term "cooling cycle" may refer to a refrigeration system comprising compression, heat exchange, and pressure reduction means to ultimately provide cooling.

The term "Controlled Freeze Zone™ (CFZ™) process" is a "cryogenic distillation" process that takes advantage of the freezing potential of carbon dioxide in cryogenic distillation, rather than avoiding solidification of carbon dioxide. In the CFZ™ process, acid gas components are separated by cryogenic distillation through the controlled freezing and melting of carbon dioxide in a column, without the use of freeze-suppression additives. The CFZ™ process uses a cryogenic distillation column with a special internal freezing section, e.g., CFZ™ section or Controlled Freeze Zone™ section, to handle the desired controlled solidification and subsequent melting of carbon dioxide. This CFZ™ section or Controlled Freeze Zone™ section generally does not contain packing or typical trays such as in conventional distillation columns. Instead, this section typically contains one or more banks of spray nozzles and a melt tray. Of course, other configurations of the CFZ™ section or freezing section may be employed. In operation, solid $CO_2$ forms in the vapor space in the CFZ™ section and falls into the liquid on the melt tray. Substantially all of the solids that form are confined to the freezing section. The portions of the distillation column above and below the freezing section of the column may be similar to conventional cryogenic demethanizer columns. For example, in the rectification section above the CFZ™ section, methane is enriched to produce an overhead methane-rich stream, while the stripping section below the CFZ™ section generates a liquid bottoms stream containing contaminants such as $CO_2$ and hydrogen sulfide with very little residual methane. The bottoms stream may be used for enhanced oil recovery or reinjected below ground for disposal by geosequestration.

The term "cryogenic" in the natural gas industry is used to refer to low temperature conditions, often those involved with propane at atmospheric pressure, such as −40° F. degrees Fahrenheit (−40° C. degrees Celsius) and colder. Cryogenic used in reference to a fluid means that the fluid is at a cryogenic temperature. Cryogenic used in reference to an item or material means that the item or material is suitable for operating at a cryogenic temperature and/or suitable for containing a cryogenic fluid. For example, a cryogenic riser is a riser that is suitable for containing a cryogenic fluid.

The term "heat exchanger" refers to a device designed to efficiently transfer or "exchange" heat from one matter to another. Exemplary heat exchanger types include co-current or counter-current heat exchangers, indirect heat exchangers (e.g. spiral wound heat exchanger, plate-frame heat exchanger, plate-fin heat exchanger, shell-and-tube heat exchanger, etc.), direct contact heat exchangers, or combinations thereof.

The terms "rectifying section", rectifying zone", "rectification section", and "rectification zone" refer to the stages above a feed point of a distillation column where the concentration of the more volatile component increases in both the liquid and the vapor. In a particular example of a cryogenic distillation column, the rectifying section refers to a section of the cryogenic distillation column where an overhead methane-rich vapor stream may be purified to meet pipeline or liquid natural gas (LNG) feed quality via conventional distillation.

The term "reflux" refers to a stream introduced into a distillation column at any location above the location at which the feed is introduced into the column, wherein the reflux is used to reduce the content of heavy components in the overhead product stream.

The terms "stripping section" and "stripping zone" refer to the stage below the feed point of a distillation column where the concentration of the more volatile component decreases in both the liquid and the vapor. For example, the stripping section refers to a section of a cryogenic distillation column in which a liquid bottoms stream rich in contaminants such as $CO_2$ and $H_2S$ is produced.

A distillation process may be used to separate contaminants from a raw natural gas stream. The distillation process is the most widely used way of effecting relative volatility based separations. The separation of carbon dioxide from natural gas, in essence methane, by distillation involves cryogenic temperatures that lead to solidification of $CO_2$ in an intermediate portion of a distillation column. As described above, the Controlled Freeze Zone™ (CFZ™) process includes a CFZ™ column that has a specially designed freezing section, i.e., a CFZ™ section or zone, to address the freezing and melting of solids within this intermediate portion of the column. Specifically, the CFZ™ section acts to control and to confine the freezing and melting of solids within its section.

During normal operations, the cryogenic distillation operation may include feeding the natural gas into the distillation column where a stream that includes lighter vapors, e.g., methane vapors, may rise upward into a rectification zone. In certain embodiments, these light vapors may flow through a freezing section. Contaminants, for example, an acid gas stream that includes $CO_2$, may be removed from the upward flowing vapor stream, the vapor stream discharging as an overhead stream rich in $CH_4$ and with reduced $CO_2$. The acid gas stream flows downward in the cryogenic distillation column through a stripping section and discharges liquid rich in $CO_2$ as a bottoms stream for disposal or recovery. The cryogenic distillation column may receive and process a natural gas feed with a wide range of $CO_2$ content, for example, from about 8 mol % to about 75 mol %. The overhead stream rich in $CH_4$ may be partially condensed to provide a liquid reflux that may be collected in a reflux accumulator. The liquid reflux in the reflux accumulator may be refluxed, e.g., via a reflux pump and piping, into the rectification zone to promote and complete the separation and removal of the contaminants.

However, before the cryogenic distillation column can produce a purified $CH_4$ gas product at normal operating conditions, the column generally undergoes start-up if the column has been shut down or idled, for example. The start-up may include taking the cryogenic distillation column from initial operating conditions to normal operating conditions. Several techniques have been devised to start cryogenic distillation columns for natural gas. For example, an assisted startup technique may make use of solidification inhibitors during startup, while another assisted startup technique employs relatively clean methane to generate clean reflux liquids during startup. However, unassisted startup techniques, depend primarily or only on the components available to the unit from the feed gas and typical utility streams, and generally have no requirements for external or special fluids.

In the present embodiments, the startup technique may use the overhead stream in a cooling cycle of the cryogenic distillation column. The cooling cycle may include the compression, cooling, and expansion of the overhead stream to provide a liquid for the liquid spray into the freezing section of the column. During the initial phase of startup, the overhead stream may include a high concentration of $CO_2$ contaminant, for example, greater than 10 mol %, or greater than 12 mol %, or greater than 14 mol %, or greater than 16 mol %, or greater than 18 mol %, or greater than 20 mol %, as compared to the less than 6 mol %, or less than 4 mol %, or less than 2 mol % concentration of $CO_2$ contaminant that is typically present in normal operations. The presence of fluids with $CO_2$ concentrations well in excess of the normal range for non-solidification portions of the equipment requires special attention if $CO_2$ solidification in undesired locations is to be avoided.

The start-up of the cryogenic distillation column may involve establishing the appropriate distillation column temperature and composition profiles that provide the desired separations and product purities while avoiding solidification, or at least limiting the solidification and melting of solids to within a freezing section zone. Unfortunately, system disturbances in the cryogenic distillation process that may occur during startup operations may cause the contaminants to solidify within the column, and may even cause contaminants to solidify outside of a freezing section of the column. The formation of solid $CO_2$ may accumulate on system equipment and eventually lead to plugging and equipment malfunction. Therefore, embodiments described herein are directed to a system and method during start-up operations to eliminate or reduce solid component formation or to confine solid component formation to a freezing section of the cryogenic distillation column in order to prevent or reduce fouling of process equipment. Again, during start-up operations, the overhead stream discharging from the cryogenic distillation column may include contaminants (e.g., $CO_2$) that can solidify during the start-up operations. Thus, purging from the distillation system streams having high concentrations in contaminants and/or being exposed to operating conditions that would lead to unwanted solidification may be needed to reduce unwanted solidification. It should be noted that while the discussion herein may at times focus on aspects of the CFZ™ technology, the present techniques are applicable to other technologies involving cryogenic distillation in general of raw natural gas, with or without a freezing section.

FIG. 1 is a block flow diagram of a natural-gas production system 100 for producing and processing natural gas or methane. The production system 100 has an intermediate-pressure purge vessel, which is labeled herein as an intermediate pressure vessel 102, to facilitate startup of cryogenic distillation in the purification of the natural gas. The production system 100 processes raw natural gas 104 extracted from the Earth via one or more production wells 105. The raw natural gas 104 may include a substantial amount of contaminants, e.g., acid gases such as $CO_2$ and/or $H_2S$, and in some embodiments, may have a low-British Thermal Unit (BTU) content, e.g., between about 500 and 950 BTUs per standard cubic foot. In the production system 100, the raw natural gas 104 may be subjected to dehydration, refrigeration cooling, and other processing in one or more different types of treatment units 106, prior to introduction as feed 108 into a purification system 110. The purification unit 110 removes contaminants as liquid acid gas 112 to give a product 114, e.g., a purified product. The product 114, which is primarily methane, may be used for power generation and/or other applications.

The dehydration in a treatment unit 106 may involve removal of water vapor using glycol dehydration, or molecular sieve desiccants, among other processes. Generally, dehydration may remove water from the raw natural gas 104 to prepare the natural gas for cryogenic separation in the purification system 110 in which water would freeze and plug piping and equipment. The dehydrated raw natural gas may be further processed by refrigeration cooling or chilling prior to being fed into cryogenic distillation in the purification system 110. The refrigeration may be in a treatment unit 106 or in the purification system 110. The dehydrated raw natural gas may enter a chiller or refrigeration system where its temperature may be lowered, for example, to about $-60°$ F. (approximately $-51°$ C.). A dry chilled natural gas may emerge from the chiller to be introduced as feed 108 into a cryogenic distillation column system 116 in the purification system 110. Alternatively, the dry chilled natural gas could be subjected to further cooling as by expansion through a Joule-Thompson (JT) valve, for example, prior to introduction as feed 108 into the cryogenic distillation column system 116 in the purification system 110. Of course, other processing of the raw natural gas 104 prior to introduction to the cryogenic distillation column system 116 may be implemented. Moreover, natural gas liquids (NGL) may also be removed from the feed 108 in the purification system 110 if not removed in treatment unit 106.

Again, the purification system 110 may remove contaminants, such as acid gas 112, from the feed 108 via a cryogenic distillation column system 116 to give a product 114, i.e., a purified $CH_4$ product. As mentioned, the cryogenic distillation may involve the Controlled Freeze Zone™ (CFZ™) technology available from ExxonMobil, or other cryogenic processes. These cryogenic processes can generate a liquid acid gas 112 that includes $CO_2$ and $H_2S$, as well as other compounds. In addition to removing the liquid acid gas 112, the purification system 110 may also remove higher carbon number hydrocarbons, e.g., $C_2$ and higher. Moreover, as also indicated, the cryogenic distillation column system 116 may include an intermediate pressure vessel 102 to facilitate startup of the cryogenic distillation column system 116. The intermediate pressure vessel 102 will be discussed in more detail below with respect to subsequent figures.

Additionally, the production system 100 may generally include one or more control systems 118 which may include a distributed control system (DCS), programmable logic controller (PLC), and so on. The control system 118 may have a human interface (HMI) and facilitate control of the production system 100 including the intermediate pressure vessel 102 and the purges in the purification system 110 to the intermediate pressure. In general, the control system 118 may direct the operation of equipment associated with the system 100. The control system 118 may include instrumentation, computers, computer memory, a processor, and so forth. Further, the control system 118 may include control schemes stored in memory and executable by the processor to implement or facilitate control actions associated with the operation of the equipment.

In sum, the raw natural gas 104 may be produced from a well 105 and then dehydrated and chilled in a treatment unit 106, and fed as feed 108 to the purification system 110 and its cryogenic distillation column system 116. The feed 108 and may include methane ($CH_4$) and at least one acid gas component, e.g., carbon dioxide ($CO_2$). In examples, the feed 108 may include a $CO_2$ concentration ranging from about 8 mol % to about 70 mol %, along with concentrations of hydrogen sulfide ($H_2S$), mercaptans, heavier hydrocarbons, among other contaminants and impurities. At higher concentrations, the $CO_2$ contaminant acts as a diluent and significantly lowers the heat content of natural gas. In the presence of water, the $CO_2$ contaminant renders the natural gas as a corrosive gas. Removal of the $CO_2$ contaminant from the feed 108 is desirable to provide a natural gas product for delivery to a pipeline, natural gas liquids recovery, helium recovery, nitrogen recovery, or conversion to liquid natural gas, among others applications.

Figure 2:
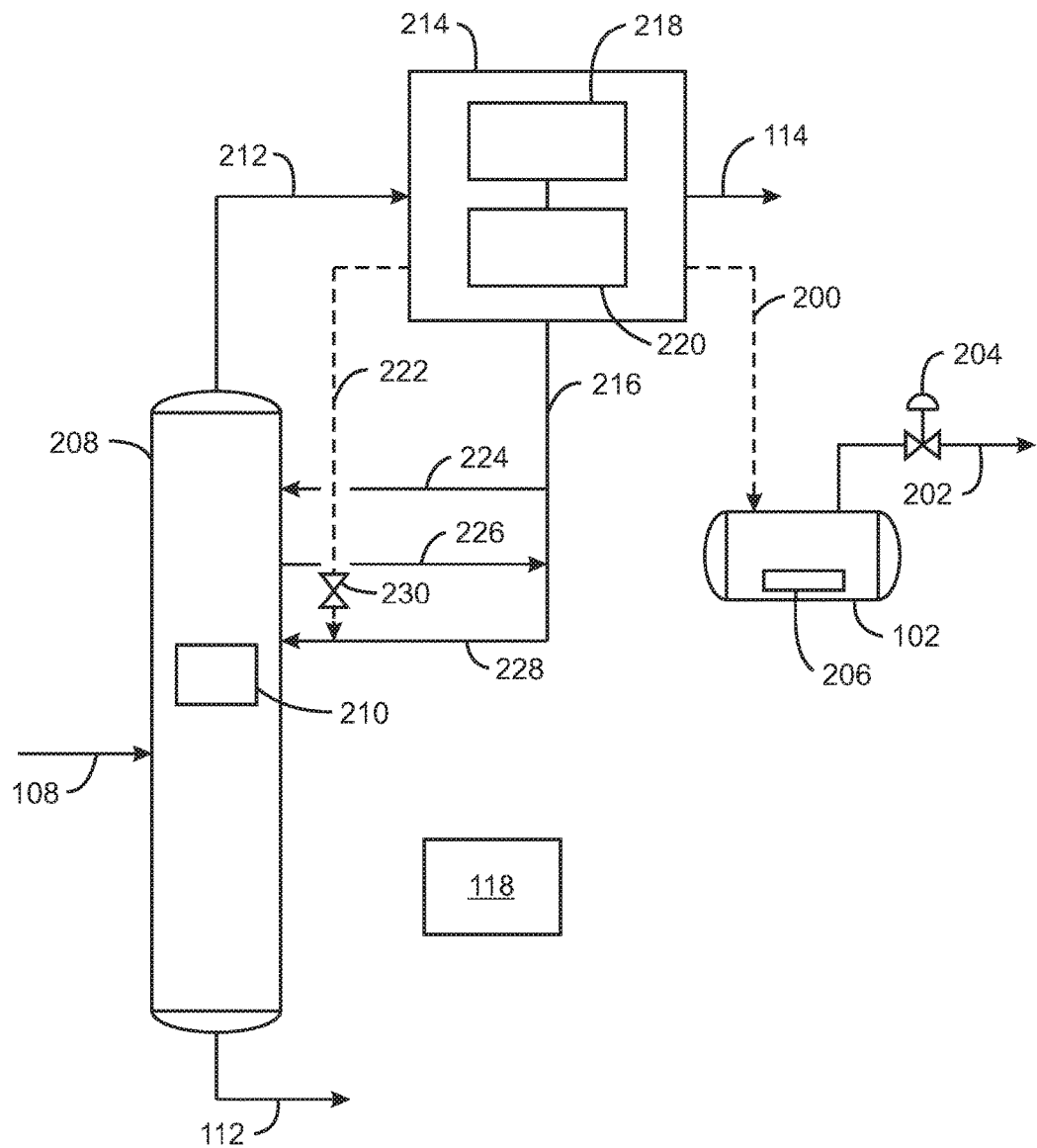
FIG. 2 is a simplified process flow diagram of a cryogenic distillation column system of the production system of FIG. 1.

FIG. 2 is a simplified process flow diagram of a cryogenic distillation column system 116 of the production system 100 of FIG. 1. The system 116 includes the intermediate pressure vessel 102 to receive and collect one or more purges 200 from within the cryogenic distillation column system 116, such as from an overhead system or from the distillation column. Then, the purge material 202 is discharged generally as a vapor stream from the intermediate pressure vessel 102 to a flare system/recovery system (not shown). The pressure in the intermediate pressure vessel 102 may be maintained at an intermediate pressure via a pressure control valve 204 or backpressure control valve, for example. Moreover, the intermediate pressure vessel 102 may have a heater 206 to melt solids that may accumulate in the pressure vessel 102. While the heater 206 is depicted as disposed internal to the intermediate pressure vessel 102, the heater 206 may instead be disposed external to the intermediate pressure vessel 102.

The cryogenic process of system 116 employs a cryogenic distillation column 208 that separates and removes the $CO_2$ contaminant from the feed 108. In certain embodiments, the column 208 may be a CFZ™ column. In other embodiments, the column 208 is not a CFZ™ column. In general, the column 208 may be used for the condensation, separation, and removal of the $CO_2$ contaminant from the feed 108, e.g., dehydrated and chilled natural gas, to produce a product 114, i.e., a purified $CH_4$ gas product. In the illustrated embodiment, the column 208 has a freezing section 210. In certain embodiments, the freezing section 210 may be a CFZ™ section. In other embodiments, the column 208 and freezing section 210 is not associated with the CFZ™ technology. The feed 108 may enter the column 208 at a stripping section below the freezing section 210. A vapor stream richer in the more volatile compound, e.g., methane, may flow upward through the freezing section 210 and continue through a rectifying section of the column 208 to discharge as a vapor overhead stream 212. A liquid stream richer in the less volatile component, e.g., $CO_2$, may travel down the column 208 through the stripping section and discharge as a bottoms stream rich in acid gas 112 including $CO_2$. A portion of the bottoms stream may be vaporized in a reboiler (not shown) and return as vapor and reintroduced to the column 208.

The overhead stream 212 rich in methane, i.e., a purified $CH_4$ stream, may enter an overhead system 214 to give a methane reflux 216 and a product 114, i.e., a methane product. To do so, the overhead system 214 may include a condensation system 218 and a reflux system 220. As discussed below, the condensation system 218 may include a heat exchanger, compressor, cooler, a Joule-Thompson (JT) expansion valve, turbo-expander, and so forth. The reflux 216 may provide a rectifier reflux 224. The reflux 216 may additionally provide a stripper reflux, or spray liquids 228, to the freezing section 210. It should be noted that where a spray assembly is not employed in the cryogenic distillation, the spray liquids 228 may be merely labeled as a reflux stream, which may enter through column through a distributor, for example. Where a spray is employed, the spray liquids 228 may flow through a spray distributor or spray assembly in the column 208 to spray in the freezing section 210. Further, a draw 226 may be taken from the bottom of the rectifying section, for example, to supplement the stripper reflux or spray liquids 228. Moreover, as discussed below, a startup stream 222 from the overhead system 214 may enter across, for example, a JT valve 230, i.e., a JT-expansion valve, to the spray assembly at the freezing section 210. Furthermore, during startup, purges may be collected from the column 208. For instance, a purge (not shown) may discharge from the bottom of the rectification section to the intermediate pressure vessel 102.

As for the reflux system 220, the reflux system 220 may include a reflux accumulator vessel, a reflux pump, and other equipment. During startup of the cryogenic distillation column system 116, the overhead system 214 may provide the aforementioned startup stream 222 rich in methane, but with $CO_2$ content in excess of normal operating conditions. The startup stream 222 may be vapor and provided from the condensation system 218 to the column 208, bypassing the reflux system 220. Provision of this startup stream 222 may be discontinued once a reflux 216 via the reflux system 220 is established. The startup stream 222 may go across a JT valve 230 or nozzle at the distillation column 208 to condense into liquid. Moreover, the startup stream 222 may be provided for spray in the distillation column 208 during startup. Of course, various other configurations for a startup stream are contemplated.

In general, before normal operations can begin, start-up operations may take place to move the column system 116, e.g., a cryogenic distillation system, such as a CFZ™ column system, from a shutdown and empty state into a steady state, e.g., normal operations. As will be further described, the startup operations of the system 116 may progressively reduce the $CO_2$ content, originating from the feed 108, in a startup stream 222 that may serve as a spray to lower the concentration of the $CO_2$ contaminant in the overhead stream 212 until a non-solidifying concentration target is reached. The startup operations may employ the condensation system 218 having a cooling cycle, as will also be later described, which continually recycles the overhead stream 212 until the concentration of $CO_2$ in the overhead stream 212 is lowered to a normal, non-solidifying range of about 2 mol % to about 6 mol %, or from about 3 mol % to about 5 mol %. However, there are often many challenges related to the startup of a distillation column 208 due to nonlinear and wide operating ranges of the column during transient periods. For instance, in the "unassisted" startup of the distillation column 208, high $CO_2$ content gas circulates through the rectifier portion of column 208 and through the overhead system 214, before the $CO_2$ content is reduced to a non-solids forming concentration and before liquid reflux is generated. Residual fluids having high $CO_2$ content may remain in vessels or lines not yet placed in full operation in the startup sequence. Unless these fluids having high $CO_2$ are purged, the fluids can lead to solidification when exposed to cold temperatures as the vessels, lines and other system components having the residual fluids are brought into full (normal) operation at cryogenic temperatures.

In embodiments, the pressure vessel 102 accepts purges 200, so that solidification outside of the freezing section 210 is reduced or prevented. In the illustrated embodiment, one or more purges 200 are vented from the overhead system 214 to the intermediate pressure vessel 102. Of course, purges 200 may originate and be collected from systems and equipment within the distillation column system other than the overhead system 214. Indeed, purge(s) 200 may typically also originate from systems and components connecting to column 208. Moreover, as previously indicated, the control system 118 may direct the operation of equipment, the amount and location of the purges/vents, the pressure control valve 204, and so on.

Certain embodiments may provide the intermediate pressure drum or vessel 102 such that little or no solids are formed via the purges 200. If solids are likely to form even at the intermediate pressure, the contents of the vessel 102 in particular embodiments may be heated via the heater 206 such that solids formed are melted or solidification conditions are generally avoided or not achieved. The contents of the intermediate pressure vessel 102 can then be sent as purge material 202 in a more controlled fashion to a flare system. In other words, such a configuration may be more controlled than a direct purge from the distillation to the flare system, without an intermediate vessel. Moreover, the flare system may be a conventional flare system serving the overall facility. By providing the intermediate pressure vessel 102 operating at an exemplary pressure only marginally lower (e.g., about 50 psig lower, or about 75 psig lower, or about 100 psig lower, or about 125 psig lower, or about 150 psig lower, or about 175 psig lower, or about 200 psig lower) than the operating pressure of the distillation and respective purge, the solidification by expansion cooling across the purge control valves is substantially reduced or eliminated. Advantageously, the purges 200 and the intermediate pressure vessel 102 may promote reliable cool-down of the reflux accumulator and piping that does not come into play until later in the startup procedure and in normal operation. Indeed, the fluids used for this cooling may be sent to the purge vessel or intermediate pressure vessel 102 rather than disrupting the startup procedure. In contrast, keeping these fluids, which are warmed by cooling the reflux system, in the cryogenic distillation column system 116 rather than purging these fluids could disrupt the startup procedure by introducing relatively warm fluid streams into an otherwise colder portion of the system 116. Furthermore, the purges 200 and the intermediate pressure vessel 102 may provide for reliable purging of high $CO_2$ fluids. For example, high $CO_2$ fluids may be purged from the bottoms of the rectifying section in the column 208 and/or from an associated spray pump or reflux pump, for instance.

Figure 3:
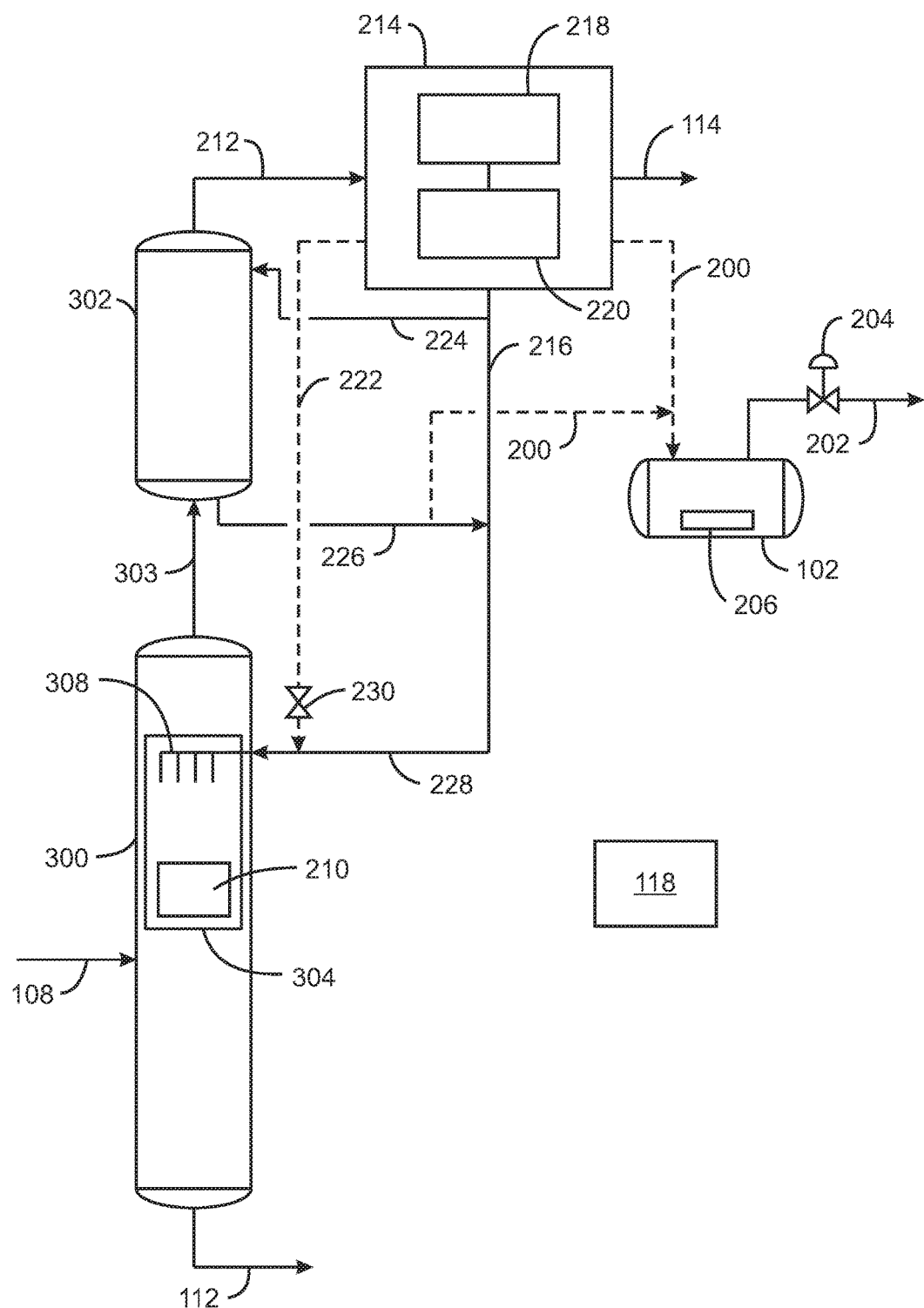
FIG. 3 is a simplified process flow diagram of another configuration of the cryogenic distillation column system of FIG. 2.

FIG. 3 is a simplified process flow diagram of the cryogenic distillation column system 116A which is another configuration of the cryogenic distillation column system 116 of FIG. 2. The system 116A includes the intermediate pressure vessel 102. In the illustrated embodiment of FIG. 3, the cryogenic distillation column 208 of FIG. 2 is configured as a split-tower design into two columns 300 and 302. This split-tower design may be implemented in an effort to facilitate offshore deployment, to provide for ease of transportation and installation, to facilitate start-up of the column 208, and so forth. In the embodiment illustrated in FIG. 3, the column 208 of FIG. 2, is replaced by the first column 300, where a stripping section and a freezing section 210 are disposed, and the second column 302, which includes a rectifying section to receive vapor 303 from the first column 300. The arrangement of the columns 300 and 302 may vary depending on usage requirements. In the illustrated embodiment, the second column 302 may operate as typical distillation column. In other embodiments, the freezing section 210 may be included in the second column 302 with and below the rectifying section. Other column configurations may be used.

The cryogenic distillation column system 116A includes the overhead system 214. Moreover, as previously indicated, the control system 118 may direct the operation of equipment including operation of the overhead system, the amount and location of the purges/vents, and so forth. The control system 118 may, for example, direct the pressure control valve 204 on the intermediate pressure vessel 102 to maintain the vessel 102 at a desired pressure.

Referring to FIG. 3, during startup operations the feed 108 may be introduced into the first column 300 at the stripping section to produce a $CO_2$ rich bottoms stream, i.e., a bottoms stream of liquid acid gas 112, and a freezing section vapor stream. The $CO_2$ rich bottoms stream 112 may exit the column 300 at a bottom outlet, as shown in FIG. 3. The freezing section vapor stream may be at a temperature and pressure with a substantially lower concentration of $CO_2$ than stream 112, and may flow into the freezing section 210. The vapor stream exiting the freezing section 210 may discharge from the lower or first column 300 as the vapor 303 stream to the second column 302, and continue to flow upwards through the rectifying section of the column 302 and exit as the overhead stream 212.

As discussed with respect to FIG. 2, the overhead system 214 may provide a reflux 216. In the illustrated embodiment of FIG. 3 for normal operation, the reflux 216 may be split and sent as spray liquids 228 to the first column 300 and as rectifier reflux 224 to the second column 302. In certain embodiments, the spray liquids 228 may be CFZ™ spray liquids. In examples, the bottoms or draw 226 of the rectifying section or the second column 302 may constitute the majority of the reflux or spray liquids 228 during normal operations. The cryogenic distillation column 208 of FIG. 2 or the first column 300 of FIG. 3 may include a spray assembly 308 to spray the spray liquids 228. Such spray may facilitate operation of the freezing section 210 and the stripping section. It should be noted that during startup prior to establishment of a consistent or reliable reflux 216, a startup stream 222 may be provided from the overhead system 214, e.g., from the condensation system 218, to at least the first column 300 for the liquid spray through the spray assembly 308.

As discussed, an unassisted startup procedure for the cryogenic distillation system may be one that generally does not involve the use of solidification inhibitors or the need for a supply of clean methane to generate clean reflux liquids. The unassisted startup may handle high $CO_2$ streams at non-solidifying conditions, and at solidifying conditions in the freezing section 210. After being chilled in upstream feed chillers and introduced into the first column 300, high $CO_2$ vapors, e.g., about 20 mol % $CO_2$, emerge from the melt tray of the freezing section 210 and discharge in the overhead stream 212.

During startup, the overhead stream 212 is compressed by the condensation system 218 of the overhead system 214 to pressures, e.g., 1000-1500 psig, which are above the $CH_4$—$CO_2$ solidification dome, e.g., 719 psig, of the thermodynamic equilibrium phase diagram, such as the phase diagram depicted in Donnelly, H. G. and Katz, D. L., Industrial and Engineering Chemistry, Vol. 46, No. 3, pp. 513 and 515, year 1954. The compressed stream is then chilled against itself, i.e., against the lower-pressure overhead stream 212 feed to the compressor, and is sent as startup stream 222 across a JT valve 230 into the freezing section 210 through startup nozzles or spray assembly 308. The effect of dropping from the compressed pressure to the pressure of the freezing section 210 (e.g., 550-600 psig) lowers the temperature of the stream 222, condensing some vapor in the stream 222 into liquid. This condensed liquid in stream 222 is sprayed via the spray assembly 308 into the freezing section 210. The spray of stream 222, over time during the startup, reduces progressively the concentration of $CO_2$ in the vapor stream leaving the freezing section 210. In embodiments, an equilibrium involving temperature and composition gradually shifts over time to reduce $CO_2$ content. In other words, the stream 222 over time is gradually cooler and progressively lower in $CO_2$ content, and the vapor stream leaving the freezing section 210 becomes progressively lower in $CO_2$ content. The overhead stream 212 enters an overhead heat exchanger and compressor of the condensation system 218 to continue the cycling loop. As discussed below, the startup stream 222 may be discontinued when the normal reflux becomes available. It should be noted that the spray assembly 308 may also be employed during normal operations. Moreover, the spray assembly 308 and the freezing section 210 may be in a combined freezing section 304.

After some time during startup, as the $CO_2$ concentration drops into a non-solidifying range, e.g., to 2-6 mol % $CO_2$, or from 3-5 mol %, a portion of the high-pressure cooled vapors of the startup stream 222 is diverted towards the reflux system 220. The diverted vapors are sent across a valve, e.g., the JT valve 406 of FIG. 4, to generate reflux liquids for accumulation in the reflux accumulator. Once sufficient reflux liquids are accumulated, the reflux 216 can be directed, such as via rectifier reflux 224 stream, to the rectifying section of column 208 (FIG. 2) or to the second column 302, e.g., rectifying column, in the split tower configuration. In turn, when sufficient liquids accumulate at the bottom of the rectifying section of column 208 or at the bottom of the second column 302 of the split tower configuration, a draw 226 can provide a source of spray to the freezing section 210. In other words, a spray pump can be started and provide sprays via draw 226, spray liquids 228, and spray assembly 308, as in normal operations, to the freezing section 210. At that point in time for certain embodiments, the flow of high-pressure compressed overhead vapors via startup stream 222 to the freezing section 210 can be discontinued and startup concluded, and the cryogenic distillation system 116 or 116A stabilized toward steady conditions and normal operation.

At various stages of these techniques, there may be a need to cool certain vessels and piping, and purge some volumes that may contain residual high $CO_2$ concentration vapors. Indeed, keeping the fluids of these cooling operations in the distillation system would have disruptive repercussions and are instead generally better purged from the distillation system, such as on an intermittent and/or substantially continuous basis. However, the purging of fluids from the distillation system to a near-atmospheric flare system, for example, may carry the potential for plugging of the purging system. Indeed, the temperature and pressures downstream of the purge valves (without the intervening vessel 102) can frequently be in the thermodynamic solidification regime. Moreover, the solids may not be swept away efficiently by the vapor or liquid being purged. Plugging of the purge system can prevent appropriate purging of the cryogenic distillation column system 116 or 116A and, in turn, prevent the successful startup of the system 116 or 116A.

Therefore, as discussed, systems 116 and 116A include the intermediate pressure vessel 102 to receive and collect one or more purges 200 from within the distillation column system 116 or 116A, such as from an overhead system 214 or from the cryogenic distillation column 208 or from the second column 302, i.e., rectifying column, in the split-tower configuration. Then, the purge material 202 is discharged from the intermediate pressure vessel 102 to a flare system/recovery system (not shown). As mentioned, the pressure in the vessel 102 may be maintained at an intermediate pressure, e.g., at least about 50 psig lower than the pressure upstream of the purge, via, for example, a pressure control valve 204 or backpressure control valve. Thus, solidification of the purges 200 may be reduced or avoided. In general, examples may maintain the operating of pressure of the intermediate pressure vessel 102 via a pressure control valve 204 disposed on a conduit conveying the purge material from the intermediate pressure vessel to the flare system or the recovery system. Moreover, the intermediate pressure vessel 102 may have a heater 206 to prevent solids from forming and/or to melt solids that may accumulate in the vessel 102. The heater 206 may also vaporize liquids.

Figure 4:
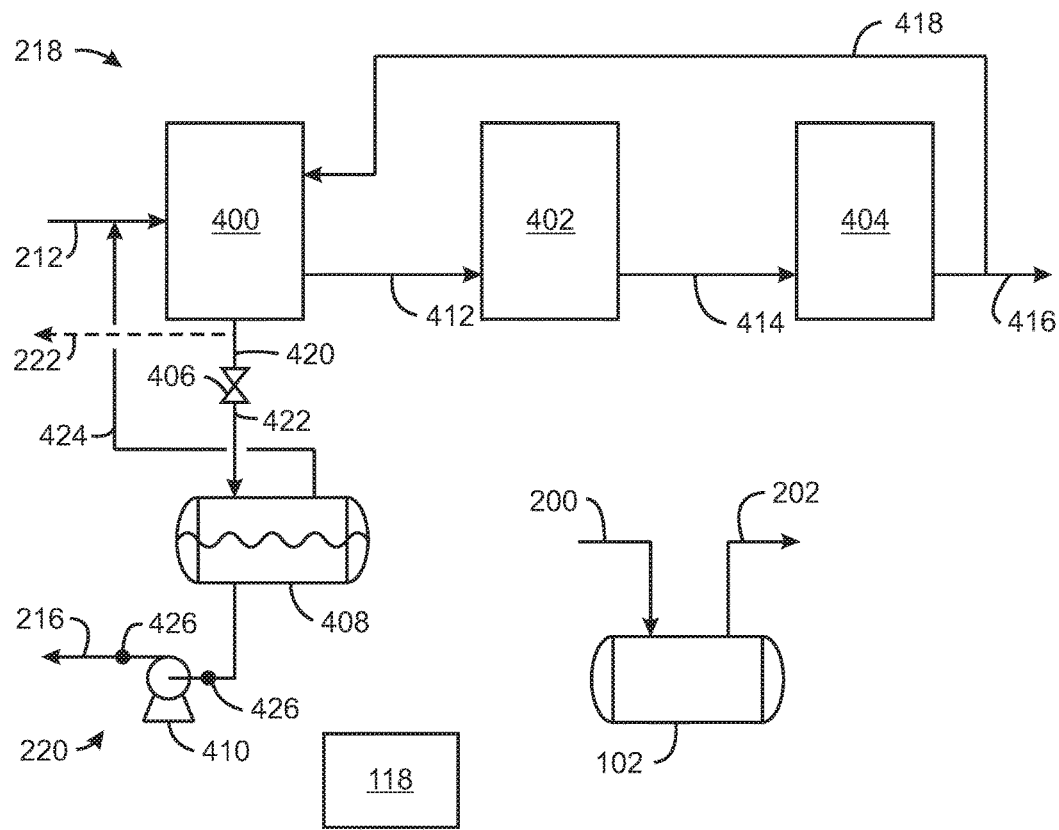
FIG. 4 is a simplified process flow diagram of an overhead system of the cryogenic distillation column systems of FIGS. 2 and 3.

FIG. 4 is a simplified process flow diagram of an overhead system 214 of the cryogenic distillation column systems of FIGS. 2 and 3. As mentioned, the start-up operations of the cryogenic distillation systems 116 and 116A may progressively reduce the $CO_2$ content in a startup stream 222. The stream 222 may serve as a reflux or a spray to lower the concentration of the $CO_2$ contaminant in the vapor flowing upward through the column. The stream 222 may be employed, for example, until a non-solidifying $CO_2$ concentration target is reached in the overhead stream 212. The start-up operations may include a cooling cycle, as depicted, that continually recycles the overhead stream 212 until the concentration of $CO_2$ is lowered to a normal, non-solidifying range of, for example, about 2 mol % to about 6 mol %. In the illustrated embodiment, the overhead system 214 has a condensation system 218 (FIGS. 2 and 3) having a heat exchanger 400 such as a plate-fin heat exchanger, a compressor 402, a cooler 404 such as an air cooler, and at least one JT valve 406, and so on. The overhead system 214 also includes a reflux system 220 (FIGS. 2 and 3) having a reflux accumulator or vessel 408, a reflux pump 410, and other equipment.

In operation, the overhead stream 212 from the column 208 (FIG. 2) or column 302 (FIG. 3) enters the heat exchanger 400 and is then sent as warm vapor 412, e.g., at 60° F., to the compressor 402. The warm vapor 412 may be compressed by the compressor 402 and then cooled as compressed vapor 414 in the cooler 404 to give a cooled compressed vapor 416. The cooled compressed vapor 416 may be analogous to the product 114, i.e., methane product, of FIGS. 1-3. In addition, the cooled compressed vapor 416 may be returned as recycle 418 to the heat exchanger 400 for cross-exchange with the incoming overhead stream 212. In some embodiments, the compressor 402 may increase the pressure of the warm vapor 412 stream from about 600 psig to about 1250 psig, for example. The compressed vapor 414 and cooled compressed vapor 416 may have the same or similar composition as the overhead stream 212 that entered the heat exchanger 400.

The cooled compressed vapor 416 as recycle 418 may be further cooled in the heat exchanger 400 to an operating temperature of about −90° F., for example, and discharged as cold vapor 420. The cold vapor 420 may be initially sent as the startup stream 222 for spraying in the column 208 or 300 during startup. Subsequently, as non-solidifying conditions are met, cold vapor 420 may be directed across the JT valve 406 to condense some of the vapor 420 and give a partially liquefied stream 422. The liquid in stream 422 may be the reflux accumulated in the reflux vessel 408, i.e., reflux accumulator vessel. Once an adequate amount of liquid is accumulated in the reflux vessel 408, the reflux pump 410 may provide reflux 216 to the cryogenic distillation column 208 (FIG. 2) or to the second column 302 (FIG. 3), i.e., rectifying column. Further, a vapor flow 424 may be established from the reflux vessel 408 vapor space to the inlet of the heat exchanger 400 or elsewhere in the overhead system.

As discussed, the overhead system 214 may send intermittent or continuous purges 200 to the intermediate pressure vessel 102. The purge materials 202 may be sent from the intermediate pressure vessel 102 to a flare or recovery system. Again, the pressure in the vessel 102 may be maintained at an intermediate pressure via a pressure control valve 204, for example. Moreover, the intermediate pressure vessel 102 may have a heater (e.g., heater 206 of FIGS. 2 and 3) to melt solids that may accumulate in the vessel 102. A control system 118 may facilitate control of the pressure and any heating in the vessel 102. Lastly, exemplary purge points 426 are noted in FIG. 4. Of course, other locations for purge points may be implemented. These purge points 426 and other purge points may be the source location of some of the purges 200 to the intermediate pressure vessel 102.

Figure 5:
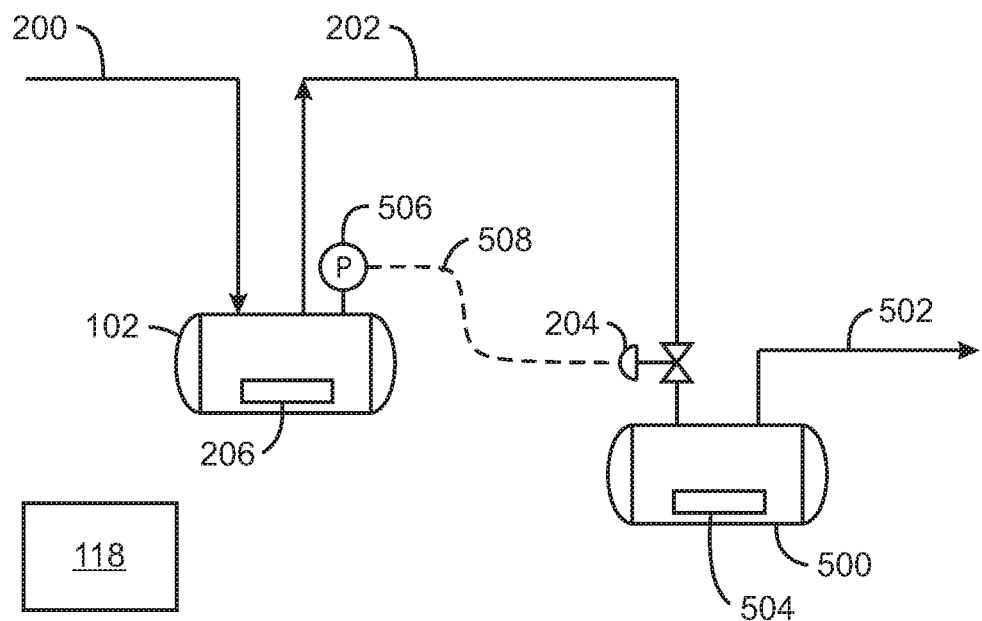
FIG. 5 is a simplified process flow diagram of a vent system for the cryogenic distillation column systems of FIGS. 2 and 3.

FIG. 5 is a simplified process flow diagram of an exemplary vent system 501 for the distillation column systems of FIGS. 2 and 3. The vent system includes aforementioned intermediate pressure vessel 102 and a flare knockout drum or vessel 500. The intermediate pressure vessel may discharge the purge material 202 stream, i.e., a vent stream of the purge material from the distillation system, through a dedicated subheader, as depicted, or may discharge through a shared subheader or header. The flare knockout vessel 500 may receive other vent or purge streams (not shown) via flare headers and subheaders from various units and processes within the production system 100 and other systems. The flare knockout vessel 500 may discharge an overall vapor stream 502 to the flare (not shown). The knockout vessel may also have a heater 504 to vaporize any liquids generally that might accumulate in the knockout vessel 500. Further, the heater 504 may vaporize and or melt any $CO_2$ that solidifies in the flare knockout vessel 500.

In certain embodiments, the pressure control valve 204 may be disposed at or near the flare knockout vessel 500. Indeed, the pressure control valve 204 may be placed on top of the flare knockout vessel 500 such that any solids that may form across the control valve 204 upon the pressure reduction may fall freely or substantially freely into the flare knockout vessel 500 to the bottom portion of the knockout vessel 500. Further, the vapor discharge of the flare knockout vessel 500 for overall vapor stream 502 may be located at a sufficient distance away from the entrance of the purge material 202 stream, i.e., the purge vapor stream, so to prevent or reduce any solids carry over in the overall vapor stream 502 to the flare. Additionally, the flare knockout vessel 500 may be configured with flow components, e.g., baffles, plates, etc. (not shown), so that the vapor exiting in the vapor stream 502 is forced to make a sudden change in direction prior to exiting the vessel 500. Such flow components may facilitate separation of any entrained solids back into the vessel 500 and prevent the solids from exiting the vessel 500 with the vapor stream 502.

Further, a pressure element 506 may be disposed on the intermediate pressure vessel 102 to sense and indicate the pressure of the intermediate pressure vessel 102. The indication of the pressure via the pressure element 506 may be an input 508 to a control block of the control system 118 to adjust the valve opening position of the pressure control valve 204 to maintain the operating pressure of the vessel 102 at the pressure set point of the control block. Such a control scheme may be employed whether the control valve 204 is located at or near the knockout vessel 500 or further upstream closer to the intermediate pressure vessel 102.

In summary, the separation of $CO_2$ from natural gas, in essence methane, by distillation may involve cryogenic temperatures that would lead to solidification of $CO_2$ in an intermediate portion of a distillation column or tower. Such solidification may plug and render conventional distillation towers inoperable. In contrast, a specially designed freezing section (e.g., freezing section 210 of FIGS. 2 and 3) in an intermediate portion of the column or tower, may address the freezing and melting of solids within this intermediate portion of an otherwise conventional distillation tower. In particular embodiments, a freezing section may allow and manage freezing and solids formation, and the melting of the solids formed.

The startup of a cryogenic distillation column system may involve establishing the appropriate distillation column temperature and composition profiles that provide the desired separations and product purities while avoiding solidification. In some embodiments, solidification and melting of solids may be allowed and substantially limited to within the freezing section. As mentioned, several techniques have been devised to start cryogenic distillation units. One technique makes use of solidification inhibitors during startup, while another technique makes use of relatively clean methane to generate clean reflux liquids during start up. Yet other startup techniques, such as the unassisted or bootstrap techniques, may generally depend only on the components available to the unit from the feed and has no or little requirements for external or special fluids.

The unassisted or bootstrap approach may involve the handling of high $CO_2$ vapor streams, e.g., having about 20% $CO_2$, in portions of the distillation system that normally do not see vapor streams with $CO_2$ concentrations above 2% to 6%. The highest $CO_2$ concentrations in vapors rising from the feed stage generally occur in time at initiation of startup. The rising vapors are at a cold temperature but generally not so cold to solidify $CO_2$. The high $CO_2$ concentration vapors discharge from the column overhead and are compressed to a pressure above the solidification "dome." The compressed vapors are then reduced in pressure (e.g., through valve 230) at the inlet of special spray nozzles in the freezing section of the cryogenic distillation column. The compressed vapor may experience the pressure reduction by flowing through a pressure reducing valve (JT valve 230) at the inlet of the spray nozzles. This expansion via reduction in pressure lowers the temperature of the compressed vapor flowing across the pressure reducing valve at the inlet to the spray nozzles. This reduction in pressure and reduction in temperature of the compressed vapor during startup can result in solids formation but if so, the solids formation occurs in the one section (freezing section) capable of handling solids that may form.

As the expanded fluids discharging from the JT valve at the inlet of the spray nozzles cool the freezing section, the vapors rising from the freezing section become progressively colder over time during startup. The rising vapors are sent as a column overhead stream (e.g., the overhead stream 212) to a heat exchanger (e.g., cross-exchanger or heat exchanger 400) for cross-exchange with the compressed vapor (e.g., high-pressure vapor 416 or recycle 418) discharged by the compressor through a cooler (e.g., cooler 404). The compressed vapor (e.g., startup stream 222) exiting the cross-exchanger enters the JT valve (e.g., valve 230 of FIGS. 2 and 3) at the inlet of the spray nozzle. Consequently, during startup, the system vapors having initially high $CO_2$ change progressively over time to colder and colder temperatures, and to lower and lower $CO_2$ content in response to the compressed fluid going through the JT valve to the spray nozzles. As the startup progresses, the vapors rising from the freezing section and discharging the column as an overhead stream (e.g., 212) fall to within the normal range of 2 to 6% $CO_2$ content. Upon this occurrence, normal reflux generation can be initiated and reflux directed to the rectifier section or rectifier tower (e.g., the second column 302). Liquids that accumulate at the bottom of the rectifier or second column 302 can serve as a normal source to the spray nozzle for sprays to the freezing section. At this point in time, the distillation column system can progressively be transitioned to normal spraying operations, and the supply of high pressure fluids (e.g., the compressed fluid or startup stream 222) through the start-up JT valve to the spray nozzles discontinued.

At various times and positional stages of this startup, there is the need to cool vessels and piping. Cool process streams may be introduced to the vessels and piping to displace volumes which may contain warm fluids and/or residual high-$CO_2$-concentration vapors. Discharging these displaced fluids (warm and/or having high $CO_2$) of the cooling operations into the distillation process can have disruptive repercussions. Therefore, these displaced warmer fluids may instead be purged from the distillation process. However, purging of fluids on a continuous or intermittent basis from process pressure, e.g., 550 to 625 psia, to atmospheric pressure carries the potential of frequent plugging of the purging system. The temperatures and compositions downstream of the purge control valve can frequently be within the thermodynamic solidification regime and the solids are not always swept efficiently by the vapor or liquid being purged. Plugging of the purge system can prevent appropriate purging of the distillation column system and, therefore, prevent or hinder startup of the column system. Accordingly, there is a need for a reliable means and method of purging residual fluids that have undesirable compositions and warm temperatures during the startup process. To satisfy this need, embodiments of the present techniques provide an intermediate purge vessel or intermediate pressure vessel (e.g., the intermediate pressure vessel 102).

Certain embodiments provide the intermediate pressure vessel as an intermediate purge drum at an intermediate pressure such that little or no solids are formed. If any solids are formed, the solids may be directed towards the bottom of the vessel where a heater may melt the solids. The contents of this intermediate pressure vessel can then in a more controlled fashion be discharged to atmosphere via the more conventional flaring system serving the overall facility, for example.

It should be noted that the triple point pressure of $CO_2$ is 75.1 psia, and that purges of high $CO_2$ containing fluids to conditions below this pressure and certainly to atmospheric pressure would normally result in solids formation. In contrast, purges to intermediate pressures, such as with the intermediate vessel 102, have a dual benefit of (1) not incurring much cooling due to the much reduced pressure drop and lesser associated JT effect, and (2) operating conditions remaining significantly away from solidification conditions. Thus, while the pressure in the intermediate pressure vessel 102 could be as low as 200 psig or 300 psig in some embodiments to preclude most or all $CO_2$ solidification, a desirable approach may be to operate the intermediate pressure vessel 102 at higher pressure for only sufficient pressure drop to promote reliable movement of the fluids, such as a pressure drop of about 50 psi or less from the purge point across the purge valve to the intermediate pressure vessel 102.

Certain embodiments provide reliable techniques of cooling the reflux accumulator and reflux piping that do not come into play until later in the startup procedure. Fluids used for this cooling may be sent to a purge drum or the intermediate pressure vessel rather than disrupting the startup process by introducing warm fluid streams into an otherwise colder portion of the process. Embodiments may also provide reliable techniques of purging high $CO_2$ warm fluids from the bottoms of the rectifier and associated spray pump piping without fear of fouling or plugging with $CO_2$ solids. In other words, such purging may protect the suction of the spray pump or related piping when starting the spray pump and thus very cold liquids would otherwise come in contact with pockets of residual high $CO_2$ fluids.

Figure 6:
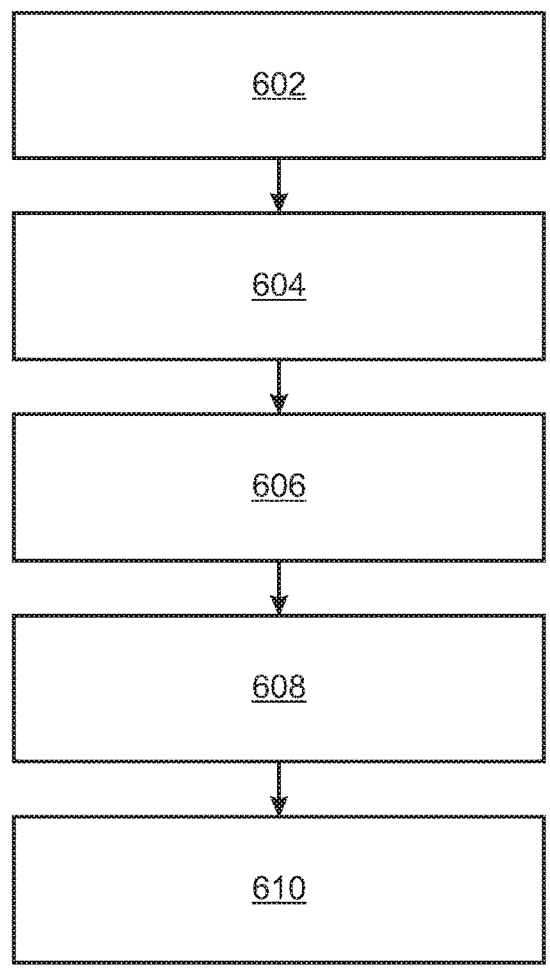
FIG. 6 is a block diagram of an exemplary method of operating a cryogenic distillation column system.

FIG. 6 is a block diagram of an exemplary method 600 of operating a cryogenic distillation column system. The cryogenic distillation may purify natural gas or methane. The method includes feeding (block 602) natural gas having methane and acid gas to a cryogenic distillation column having a freezing section. The acid gas includes carbon dioxide and other acid gases. The method includes discharging (block 604) an overhead stream rich in the methane from the cryogenic distillation column to an overhead system. This overhead steam may be used to facilitate startup of the cryogenic distillation column system. Also, this overhead stream rich in methane may be ultimately sent as a product methane stream. The cryogenic distillation column may also discharge a bottoms stream rich in the acid gas for disposal or additional processing. The term "rich" for various streams may refer to an amount, by mole or weight, of at least about 30%, or at least about 50%, or at least about 90%, or at least about 94%, and so on, of a compound (e.g., methane, carbon dioxide) or class of compounds (e.g., acid gas) in a stream.

Further, the method includes discharging (block 606), via a purge valve, a purge from the cryogenic distillation column system, such as from the overhead system or from the rectifying section or rectifying column, to an intermediate pressure vessel to reduce solidification of the carbon dioxide during startup of the cryogenic distillation column system. The purge may be a plurality of purges, and the purge valve a plurality of respective purge valves. The purge material may discharge from the intermediate pressure vessel to a flare system or recovery system. The pressure of the intermediate pressure vessel may be controlled via a pressure control valve disposed on a conduit conveying the purge material from the intermediate pressure vessel to the flare system or the recovery system. In certain embodiments, the pressure control valve is disposed at or near a flare knockout drum of the flare system. Furthermore, the method includes heating (block 608) contents, e.g., purge material, in the intermediate pressure vessel via a heater. The heater may typically be disposed in the intermediate pressure vessel.

Additionally, the method may include providing (block 610) a cooled vapor from the overhead system through a Joule-Thompson (JT) expansion valve to the cryogenic distillation column during startup of the cryogenic distillation column system. The provision of this cooled vapor may be discontinued once startup is complete or nearing completion and normal operation is implemented.

Figure 7:
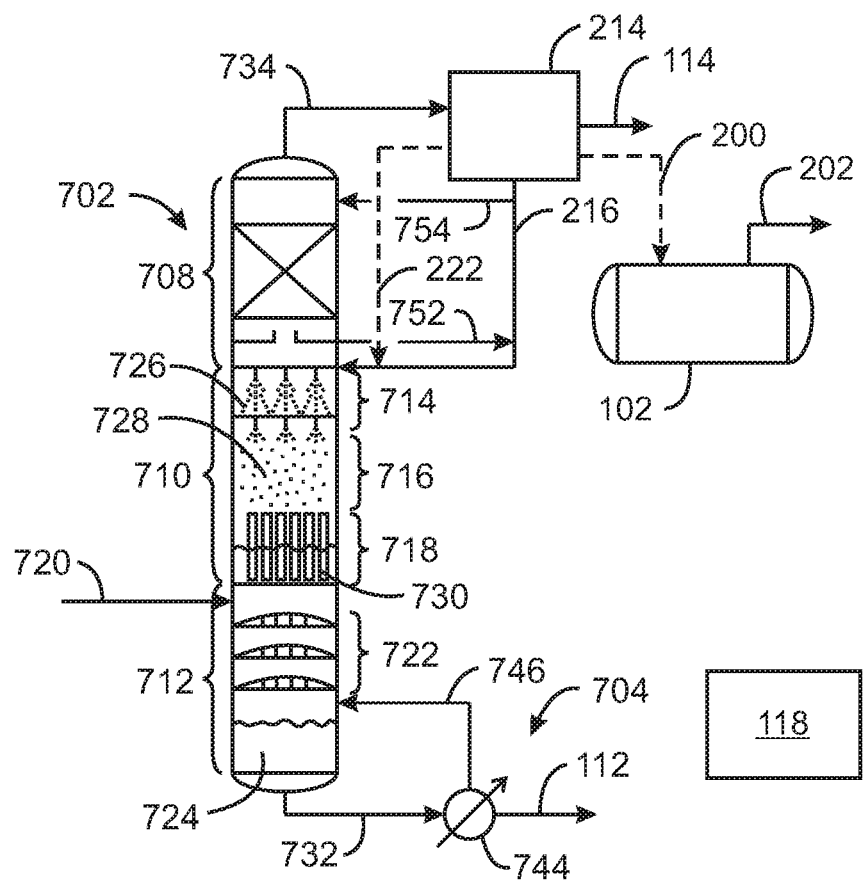
FIG. 7 is a simplified process flow diagram of a cryogenic distillation column system employed in the production and purification of natural gas and methane.

FIG. 7 is a simplified process flow diagram of a cryogenic distillation column system 116B employed in the production and purification of natural gas and/or methane. The cryogenic distillation column system is configured to receive a feed gas having carbon dioxide content. The intermediate pressure vessel 102 may be used during startup of the column system 116B. After startup and during normal operation, the intermediate pressure vessel 102 may continue to receive purges or vents, or may be placed out-of-service for normal operations.

As shown in FIG. 7, the column system 116B may include a cryogenic column 702 with an associated reboiler system 704 and an overhead system 214. Further, while the column 702 is depicted as a single column or tower, the column 702 may be implemented as two columns or towers.

In the illustrated example, the column 702 may include three separate sections, such as an upper distillation section or "rectification section" 708, a middle distillation section or "freezing section" 710, a lower distillation section or "stripping section" 712, and a freezing section 710. The freezing section 710 may include a spray nozzle bank 714, a vapor zone 716, and a melt tray 718. In particular embodiments, the vapor zone 716 may accommodate vapor generated in the freezing section 710 and with the vapor labeled as CFZ™ vapor in certain examples. Such vapor may travel up the column 702 and ultimately discharge as an overhead stream 734 from the column 702.

A feed stream, such as a chilled two-phase fluid 720, e.g., liquid/vapor phase fluid, may be introduced into the stripping section 712 where the two-phase fluid 720 may include a $CO_2$ concentration and a $CH_4$ concentration, among other heavier hydrocarbons and contaminants. Within the stripping section 712, the two-phase fluid 720 may be separated into a liquid and a vapor.

Within the stripping section 712, the liquid of the two-phase fluid 720 may collect on the series of trays 722 (or packing) and flow into a bottom portion of the stripping section 712 to form a liquid pool 724. The liquid may primarily include liquid $CO_2$, and dissolved $H_2S$, if present in the feed. The vapor of the two-phase fluid 720 may leave the stripping section 712 and proceed upward into risers in the melt tray 718. As the vapor continues upward, it may enter the vapor zone 716. The risers of the melt tray 718 may act as a vapor distributor for uniform distribution through the vapor zone 716. As the vapor continues to rise upward into the vapor zone 716, the vapor may contact a spray of cold liquid 726 emitted by the spray nozzle bank 714. When in contact with the spray of cold liquid 726, a portion of the $CO_2$ in the vapor may solidify within the freezing section 710. This may act to remove or "freeze out" the $CO_2$ contaminant within the vapor. The solidified $CO_2$ 728 may fall onto the melt tray 718 where it may be heated to form liquid $CO_2$ 730 that may be collected on the melt tray 718. The liquid $CO_2$ 730 may then flow into the stripping section 712 and into the liquid pool 724, which primarily includes liquid $CO_2$. The liquid pool 724 and liquid $CO_2$ 730 may exit the stripping section 712 as a sour liquid 732.

With contaminants removed, the vapor may continue to flow upward and into the rectification section 708, along with other light gases. The vapor may include a sweet gas 734, such as methane, $CH_4$, that may exit overhead of the column 702. The sweet gas 734, analogous to overhead stream 212 and the product 114 of previous figures, may be commercialized or used as an on-site fuel gas. It should be noted that a portion of the gas stream 734 may be used as stream 222, i.e., a spray stream, during startup or subsequently condensed in the overhead system 214 to form a condensed or partially-condensed stream for reflux 216 during normal operation. The partially-condensed stream may enter a reflux accumulator where a reflux 216, e.g., liquid condensate, may be collected and recycled back as reflux 754 into the column 702. Liquids 752 collected at the bottom of the rectifier section may be the main source of liquids for the spray of cold liquid 726. A portion of the reflux 216 stream may also be a source of liquids for the spray of cold liquid 726.

Similarly, a portion of the sour liquid 732 exiting the stripping section 712 may be heated in a reboiler 744 and returned to the bottom of the stripping section 712 as a reboiler stream, e.g., a vapor stream 746. The vapor stream 746 may provide energy to the bottom of the column 702 to boil off methane and other light components that may be dissolved in the sour liquid 732. A residual reboiled liquid, e.g., a bottoms product or liquid acid gas 112, may exit the reboiler 744.

In summary, some embodiments may be directed to a cryogenic distillation column system with a cryogenic distillation column having a freezing section. The cryogenic distillation column may be a single column, or two columns in a split-tower design. The cryogenic distillation column is configured to receive a natural gas having methane and acid gas, and to discharge an overhead stream rich in the methane, e.g., have a majority mole percent of methane, and a bottoms stream rich in the acid gas e.g., have a majority mole percent of acid gas. The acid gas discharged as a bottom stream may be generally liquid acid gas. An overhead system is configured to receive the overhead stream, and to discharge a vapor methane product and a cooled liquid for reflux to the cryogenic distillation column. An intermediate pressure vessel is configured to receive one or more purges in the cryogenic distillation column system. The intermediate pressure vessel operates at an intermediate pressure to reduce solidification of the purges.

The respective purge point for each of the purges may have a purge valve to facilitate provision of the purge to the intermediate pressure vessel. The purges may be from the overhead system, from a bottom of a rectifying section, and/or from other points in the distillation system. Furthermore, a pressure control valve may maintain an operating pressure of the intermediate pressure vessel. In particular embodiments, the pressure control valve is configured to maintain the operating pressure of the intermediate pressure vessel to within at least 200 psig of a purge pressure of the purge. The pressure control valve may be configured to maintain the operating pressure of the intermediate pressure vessel to a pressure above the triple point pressure of carbon dioxide. The intermediate pressure vessel may be configured to discharge to a flare system. The intermediate pressure vessel may be configured to discharge a vapor stream to a flare knockout drum. Further, the pressure control valve may be disposed on the vapor stream at or near the flare knockout drum. Also, the intermediate pressure vessel may have a heater. Lastly, the cryogenic distillation column overhead system may be configured to discharge a cooled vapor through a Joule-Thompson (JT) valve to the cryogenic distillation column during startup prior to significant normal reflux being established.

Other embodiments relate to a method of operating a cryogenic distillation column system, the method including feeding natural gas having methane and acid gas including carbon dioxide to a cryogenic distillation column having a freezing section. The method includes discharging an overhead stream rich in the methane from the cryogenic distillation column to an overhead system. Further, the method includes discharging, via a purge valve, a purge to an intermediate pressure vessel to reduce solidification of the carbon dioxide during startup of the cryogenic distillation column system. The purge may be a plurality of purges, and the purge valve comprises a plurality of respective purge valves. The method may include conveying vapor from the intermediate pressure vessel to a flare system. The method may include maintaining an operating pressure of the intermediate pressure vessel via a pressure control valve. In particular examples, the pressure control valve may be disposed at or near a flare knockout drum. Moreover, the method may include heating contents in the intermediate pressure vessel via a heater. The method may involve providing a cooled vapor from the overhead system through a Joule-Thompson (JT) expansion valve to the cryogenic distillation column during startup of the cryogenic distillation column system. Additionally, a bottoms stream rich in the acid gas may be discharged from the cryogenic distillation column. Also, a methane product stream may be discharged from the overhead system.

Yet other embodiments may relate to a method of operating a cryogenic distillation column system, the method including feeding natural gas having methane and acid gas to a cryogenic distillation column having a freezing section, the acid gas including carbon dioxide. The method includes discharging an overhead stream rich in the methane from the cryogenic distillation column to an overhead system. The method includes purging from the cryogenic distillation column system during startup of the cryogenic distillation column system to a flare system or recovery system to reduce solidification of carbon dioxide in the distillation column system. In other words, purging of the relevant fluids reduces undesirable solidification of carbon dioxide in the distillation system. Further, the purge is via an intermediate pressure vessel to reduce solidification of carbon dioxide in the purge. In other words, the method includes maintaining an operating pressure of the intermediate pressure vessel to reduce solidification of carbon dioxide in the purging. The pressure of the intermediate pressure vessel may be maintained via a pressure control valve or a backpressure control valve disposed on a conduit conveying the purge material from the intermediate pressure vessel to the flare system or the recovery system. The pressure control valve or the backpressure control valve is disposed at or near a flare knockout drum of the flare system. The method may include heating the purge material in the intermediate pressure vessel via a heater. Moreover, the method may include providing a cooled vapor from the overhead system through a Joule-Thompson (JT) expansion valve to the cryogenic distillation column during startup of the cryogenic distillation column system. Lastly, the method may include discharging a bottoms stream rich in the acid gas from the cryogenic distillation column, and discharging a methane product stream from the overhead system.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A cryogenic distillation column system comprising:
a cryogenic distillation column configured to receive a natural gas comprising methane and acid gas, and to discharge:
an overhead stream rich in the methane; and
a bottoms stream rich in the acid gas;
an overhead system connected to the overhead stream and configured to receive the overhead stream, the overhead system including a condensation system and a reflux system, the condensation system and the reflux system configured to cool the overhead stream and discharge a cooled liquid, generated from the cooled overhead stream in the overhead system, for reflux to the cryogenic distillation column during a normal operation of the cryogenic distillation system, the overhead system also discharging a vapor methane product, the condensation system including a compressor and a cooler, the reflux system including a reflux accumulator vessel;
a purge, vented from the overhead system; and
an intermediate pressure vessel that receives the purge only during a startup operation of the cryogenic distillation system and operates at an intermediate pressure to reduce solidification of the purge, wherein the intermediate pressure is between 50-200 psig lower than an operating pressure of the cryogenic distillation column;
a Joule-Thompson valve connected to the overhead system and configured to discharge a cooled vapor from the overhead system into the cryogenic distillation column during the startup operation.

2. The system of claim 1, comprising a purge valve to provide the purge to the intermediate pressure vessel, and wherein the intermediate pressure vessel comprises a heater.

3. The system of claim 1, wherein the cryogenic distillation column comprises two columns, and wherein the purge comprises a plurality of purges.

4. The system of claim 1, wherein the cryogenic distillation column has a freezing section, and wherein the intermediate pressure vessel is configured to discharge to a flare system.

5. The system of claim 1, comprising a pressure control valve to maintain the intermediate pressure vessel at the intermediate pressure.

6. The system of claim 5, wherein the pressure control valve is configured to maintain the operating pressure of the intermediate pressure vessel to within at least 200 psig of a purge pressure of the purge.

7. The system of claim 5, wherein the pressure control valve is configured to maintain the operating pressure of the intermediate pressure vessel to a pressure above the triple point pressure of carbon dioxide.

8. The system of claim 5, wherein the intermediate pressure vessel is configured to discharge a vapor stream to a flare knockout drum, and wherein the pressure control valve is disposed on the vapor stream at or near the flare knockout drum.

* * * * *